United States Patent
Huang et al.

(10) Patent No.: US 11,096,197 B2
(45) Date of Patent: Aug. 17, 2021

(54) DATA TRANSMISSION METHOD AND APPARATUS, RESOURCE SCHEDULING METHOD AND APPARATUS, TERMINAL, AND NETWORK-SIDE DEVICE

(71) Applicant: CLOUDMINDS (SHANGHAI) ROBOTICS CO., LTD., Shanghai (CN)

(72) Inventors: William Xiao-Qing Huang, Shenzhen (CN); Haitao Jiang, Shenzhen (CN); Zhenkai Wang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 42 days.

(21) Appl. No.: 16/587,108

(22) Filed: Sep. 30, 2019

(65) Prior Publication Data
US 2020/0029347 A1    Jan. 23, 2020

Related U.S. Application Data (63) Continuation of application No. PCT/CN2017/079388, filed on Apr. 1, 2017.

(51) Int. Cl.
*H04W 72/12*    (2009.01)

(52) U.S. Cl.
CPC ... *H04W 72/1263* (2013.01); *H04W 72/1257* (2013.01)

(58) Field of Classification Search
None
See application file for complete search history.

(56) References Cited

U.S. PATENT DOCUMENTS

| 9,450,694 B1 | 9/2016 | Jung et al. | |
| 2007/0121542 A1* | 5/2007 | Lohr | H04L 47/24 370/329 |

(Continued)

FOREIGN PATENT DOCUMENTS

| CN | 102387581 A | 3/2012 |
| CN | 102811486 A | 12/2012 |

(Continued)

OTHER PUBLICATIONS

3GPP Change Request R1-181252, "Synchronisation Slot Time Difference of Arrival", (Year: 2018).*

(Continued)

*Primary Examiner* — Chi H Pham
*Assistant Examiner* — Vladislav Y Agureyev
(74) *Attorney, Agent, or Firm* — USCH Law, PC (57) ABSTRACT

A data transmission method, a resource scheduling method, a terminal, and a network-side device are provided. The data transmission method includes: sending, to a network-side device, an operating band information list supported by the terminal and capability indication information indicating whether the terminal supports simultaneous data sending and receiving on an operating band in the operating band information list, where the operating band information list is used by the network-side device to determine an actual operating band of the terminal, and the capability indication information is used by the network-side device to determine a scheduling strategy for the terminal; and performing, when the terminal has a data service requirement, data transmission based on the actual operating band determined by the network-side device and including the at least one pair of an uplink and a downlink frequency range, and scheduling information corresponding to the scheduling strategy determined by the network-side device.

17 Claims, 5 Drawing Sheets

A terminal sends, to a network-side device, an operating band information list supported by the terminal and capability indication information indicating whether the terminal supports simultaneous data sending and data receiving on an operating band in the operating band information list — S21

When the terminal has a data service requirement, data transmission is performed based on an actual operating band that is determined by the network-side device and includes at least one pair of an uplink frequency range and a downlink frequency range, and scheduling information corresponding to a scheduling policy determined by the network-side device — S22

(56) References Cited

U.S. PATENT DOCUMENTS

| | | | |
|---|---|---|---|
| 2008/0008147 A1* | 1/2008 | Nakayama | H04W 72/082 370/338 |
| 2009/0082031 A1* | 3/2009 | Kim | H04W 72/1263 455/452.2 |
| 2012/0032854 A1* | 2/2012 | Bull | H04K 3/224 342/450 |
| 2012/0140708 A1* | 6/2012 | Choudhury | H04L 1/0031 370/328 |
| 2012/0322455 A1* | 12/2012 | Oh | H04L 5/001 455/450 |
| 2013/0235746 A1* | 9/2013 | Patel | H04W 16/10 370/252 |
| 2014/0219233 A1* | 8/2014 | Ahn | H04L 5/003 370/329 |
| 2014/0221005 A1* | 8/2014 | Marshall | G01S 5/0273 455/456.1 |
| 2014/0241220 A1* | 8/2014 | Choi | H04L 5/14 370/280 |
| 2014/0269849 A1* | 9/2014 | Abdelmonem | H04W 72/0446 375/148 |
| 2014/0335879 A1* | 11/2014 | Immendorf | H04W 72/082 455/452.1 |
| 2014/0370905 A1* | 12/2014 | Kim | H04W 8/24 455/450 |
| 2016/0014781 A1* | 1/2016 | Nagata | H04W 72/0453 370/329 |
| 2016/0218853 A1 | 7/2016 | Takeda et al. | |
| 2017/0227625 A1* | 8/2017 | Markhovsky | H04W 56/001 |
| 2017/0230915 A1* | 8/2017 | Kim | H04W 52/34 |
| 2017/0237484 A1* | 8/2017 | Heath | H04B 10/07953 398/26 |
| 2018/0020376 A1* | 1/2018 | Belghoul | H04W 72/0453 |
| 2018/0132200 A1* | 5/2018 | Gheorghiu | H04W 88/027 |
| 2018/0302890 A1* | 10/2018 | Marinier | H04L 5/0044 |
| 2019/0109677 A1* | 4/2019 | Wang | H04L 5/001 |
| 2019/0191317 A1* | 6/2019 | Safavi | H04W 24/02 |
| 2019/0208387 A1* | 7/2019 | Jiang | H04W 72/044 |
| 2019/0342775 A1* | 11/2019 | Christopherson | H04W 16/10 |
| 2020/0107227 A1* | 4/2020 | Xu | H04J 11/0056 |
| 2020/0322752 A1* | 10/2020 | Eggert | H04W 4/02 |
| 2020/0329518 A1* | 10/2020 | Liu | H04W 28/0268 |

FOREIGN PATENT DOCUMENTS

| | | |
|---|---|---|
| CN | 104519583 A | 4/2015 |
| CN | 104519585 A | 4/2015 |
| CN | 104982057 A | 10/2015 |
| CN | 105491624 A | 4/2016 |
| CN | 105517043 A | 4/2016 |
| EP | 2717640 A1 | 4/2014 |
| JP | 2007-533222 A | 11/2007 |
| JP | 2011-091747 A | 5/2011 |
| JP | 2011-182104 A | 9/2011 |
| JP | 2015-530011 A | 10/2015 |
| WO | WO 2013-040028 A2 | 3/2013 |

OTHER PUBLICATIONS

IEEE Transactions on Parallel and Distributed Systems, vol. 24, No. 8, Aug. 2013, High-Accuracy TDOA-Based Localization without Time Synchronization Bin Xu, Member, IEEE, Guodong Sun, Member, IEEE (Year: 2013).*

Extended European Search Report for the corresponding European patent application No. EP17904155, dated Dec. 19, 2019, 9 pages total.

Ericsson, "Further Discussions on UE Capability Issues for Dual Connectivity in Rel-12", 3GPP TSG RAN WG4 Meeting #72bis, R4-146354, Sep. 29, 2014, sections 3 and 5.5C.

Ericsson, "UE Capability Issues for Dual Connectivity", 3GPP TSG RAN WG4 Meeting #72, R4-145009, Aug. 12, sections 3 and 5.5C.

Ericsson, "Dependency on Inter-band CA Configurations with 2UL for Dual Connectivity Confiigurations", 3GPP TSG-RAN WG4 Meeting #73, R4-147582, Nov. 11, 2014, sections 2-3 and 5.5C.

Shenzhen Cloudminds Robotics Systems Co., Ltd., First Office Action, CN2017-80001917.5, dated Oct. 9, 2020, 26 pgs.

Shenzhen Cloudminds Robotics Systems Co., Ltd., First Office Action, JP2019-553324, dated Dec. 18, 2020, 3 pgs.

* cited by examiner

Fig. 1

A terminal sends, to a network-side device, an operating band information list supported by the terminal and capability indication information indicating whether the terminal supports simultaneous data sending and data receiving on an operating band in the operating band information list — S21

When the terminal has a data service requirement, data transmission is performed based on an actual operating band that is determined by the network-side device and includes at least one pair of an uplink frequency range and a downlink frequency range, and scheduling information corresponding to a scheduling policy determined by the network-side device — S22

Fig. 2

An operating band information list supported by a terminal and capability indication information indicating whether the terminal supports simultaneous data sending and data receiving on an operating band in the operating band information list are received from the terminal — S31

A pair of an uplink frequency range and a downlink frequency range that corresponds to an actual operating band is determined for the terminal based on the operating band information list, and a scheduling policy for the terminal is determined based on the capability indication information — S32

DATA TRANSMISSION METHOD AND APPARATUS, RESOURCE SCHEDULING METHOD AND APPARATUS, TERMINAL, AND NETWORK-SIDE DEVICE

CROSS-REFERENCE TO RELATED DISCLOSURE

The present disclosure is a continuation of international application No. PCT/CN2017/079388, filed on Apr. 1, 2017, and titled "DATA TRANSMISSION METHOD AND APPARATUS, RESOURCE SCHEDULING METHOD AND APPARATUS, TERMINAL, AND NETWORK-SIDE DEVICE", which is incorporated herein by reference in its entirety.

TECHNICAL FIELD

The present disclosure relates to the field of communications technologies, and specifically, to a data transmission method and apparatus, a resource scheduling method and apparatus, a terminal, and a network-side device.

BACKGROUND

With development of communication technologies, advanced cellular networks (such as a 4G network and a 5G network) are deployed worldwide, to satisfy a requirement of a user on communication quality and a communication rate.

In related arts, to improve coverage and a capacity of a network, a communication scheme with high band and low band is used. For example, the capacity is provided by using a high band (such as 28 GHz or 3.5 GHz), and the coverage is provided by using a low band (such as 900 MHz).

In the high band, technologies such as a massive multiple-input multiple-output and control channel beam-forming may be used to improve downlink coverage and capacity. However, for the uplink coverage of high band, a capability of uplink coverage is poorer than that of downlink coverage. This severely affects user experience.

Therefore, in some related arts, a high band and a low band are used in combination. When uplink coverage of the high band is limited, data transmission is performed on an uplink frequency of the low band.

When the high band and the low band are used in combination, a carrier aggregation manner or a dual connectivity manner may be used. No matter which manner is used, a master serving network side and a slave serving network side need to be configured for a terminal. Usually, duration of carrier aggregation configuration or dual connectivity configuration needs to be about 20 ms to 50 ms, and this brings a relatively long delay. For related burst small-sized packet service that is based on over the top (OTT), the Internet of vehicles, the Internet of things, or the like, when the carrier aggregation manner or the dual connectivity manner is used, neither of a delay and signaling overheads that are generated can effectively satisfy a requirement.

To solve a problem brought by the carrier aggregation manner or the dual connectivity manner, in some related arts, a manner of using a high-frequency TDD/FDD band and a low-frequency FDD/TDD band that are paired may be used. Based on a network coverage status and a service requirement, any one of the following twelve pairing modes is used, and a switch may be performed among different pairing modes, without a need to configure the carrier aggregation or the dual connectivity, thereby reducing a service delay and reducing related signaling overheads.

Mode 1: A high-frequency TDD downlink frequency and a high-frequency TDD uplink frequency are paired.
Mode 2: A high-frequency TDD downlink frequency and a high-frequency FDD uplink frequency are paired.
Mode 3: A high-frequency TDD downlink frequency and a low-frequency FDD uplink frequency are paired.
Mode 4: A high-frequency TDD downlink frequency and a low-frequency TDD uplink frequency are paired.
Mode 5: A high-frequency FDD downlink frequency and a high-frequency TDD uplink frequency are paired.
Mode 6: A high-frequency FDD downlink frequency and a high-frequency FDD uplink frequency are paired.
Mode 7: A high-frequency FDD downlink frequency and a low-frequency FDD uplink frequency are paired.
Mode 8: A high-frequency FDD downlink frequency and a low-frequency TDD uplink frequency are paired.
Mode 9: A low-frequency TDD downlink frequency and a low-frequency TDD uplink frequency are paired.
Mode 10: A low-frequency TDD downlink frequency and a low-frequency FDD uplink frequency are paired.
Mode 11: A low-frequency FDD downlink frequency and a low-frequency TDD uplink frequency are paired.
Mode 12: A low-frequency FDD downlink frequency and a low-frequency FDD uplink frequency are paired.

However, when particular bands are selected and paired for use, a harmonic or inter-modulation signal transmitted by an uplink of a low-band may fall within a downlink receive frequency range of a high band, causing interference to downlink receiving from uplink transmitting in a terminal, and causing abnormal operation of the foregoing pairs when the interference is serious.

In a related art, a filter may be added to a front end of a low-band transmitter of a terminal, to eliminate the interference. However, this manner increases an insertion loss, and increases costs and power consumption of the terminal. When a terminal supports relatively many pairing combinations, increases of related costs, complexities, power consumption may be unacceptable, particularly for a low-cost terminal. Therefore, for some pairing modes, when interference to downlink receiving from uplink transmitting occurs, in addition to a method of adding a filter, a scheduling method may be used to avoid the interference. For example, within a time of uplink transmitting, no data receiving is performed on downlink.

In conclusion, when a high band and a low band are paired, for a problem of interference occurring in frequency pairing, a terminal may use a plurality of different solutions. For example, a hardware filter solution may be used for a high-cost terminal, and a scheduling scheme may be used for a low-cost terminal.

For a network-side device, if the network-side device uses a same interference elimination solution for all terminals, network efficiency is reduced, and scheduling of the low-cost terminal is even infeasible.

SUMMARY

To overcome a problem existing in a related art, the present disclosure provides a data transmission method and apparatus, a resource scheduling method and apparatus, a terminal, and a network-side device.

According to a first aspect of the present disclosure, a data transmission method is provided, is applied to a terminal, and includes:

sending, to a network-side device, an operating band information list supported by the terminal, and capability indication information indicating whether the terminal supports simultaneous data sending and data receiving in an operating band in the operating band information list, where the operating band information list is used by the network-side device to determine an actual operating band of the terminal, the actual operating band includes at least one pair of an uplink frequency range and a downlink frequency range, and the capability indication information is used by the network-side device to determine a scheduling strategy for the terminal; and performing, when the terminal has a data service requirement, data transmission based on the actual operating band that is determined by the network-side device and that includes the at least one pair of the uplink frequency range and the downlink frequency range, and scheduling information corresponding to the scheduling strategy determined by the network-side device.

According to a second aspect of the present disclosure, a resource scheduling method is provided, and is applied to a network-side device, and the method includes:

receiving, from a terminal, an operating band information list supported by the terminal and capability indication information indicating whether the terminal supports simultaneous data sending and data receiving on an operating band in the operating band information list, or capability indication information indicating whether the terminal supports simultaneous data sending and data receiving on each frequency pairing combination in each operating band in the operating band information list; and determining, for the terminal based on the operating band information list, a pair of an uplink frequency range and a downlink frequency range that corresponds to an actual operating band, and determining a scheduling strategy for the terminal based on the capability indication information.

According to a third aspect of the present disclosure, a data transmission apparatus is provided, is applied to a terminal, and includes:

an information sending module, configured to send, to a network-side device, an operating band information list supported by the terminal and capability indication information indicating whether the terminal supports simultaneous data sending and data receiving on an operating band in the operating band information list, where the operating band information list is used by the network-side device to determine an actual operating band of the terminal, the actual operating band includes at least one pair of an uplink frequency range and a downlink frequency range, and the capability indication information is used by the network-side device to determine a scheduling strategy for the terminal; and a data transmission module, configured to perform, when the terminal has a data service requirement, data transmission based on the actual operating band that is determined by the network-side device and that includes the at least one pair of the uplink frequency range and the downlink frequency range that are paired, and scheduling information corresponding to the scheduling strategy determined by the network-side device.

According to a fourth aspect of the present disclosure, a resource scheduling apparatus is provided, and is applied to a network-side device, and the apparatus includes:

an information receiving module, configured to receive, from a terminal, an operating band information list supported by the terminal and capability indication information indicating whether the terminal supports simultaneous data sending and data receiving on an operating band in the operating band information list, or capability indication information indicating whether the terminal supports simultaneous data sending and data receiving on each frequency pairing combination in each operating band in the operating band information list; and a strategy determining module, configured to: determine, for the terminal based on the operating band information list, a pair of an uplink frequency range and a downlink frequency range that corresponds to an actual operating band, and determine a scheduling strategy for the terminal based on the capability indication information.

According to a fifth aspect of the present disclosure, a computer program product is provided. The computer program product includes a computer program executable by a programmable apparatus. The computer program includes a code part configured to perform the method in the first aspect when being executed by the programmable apparatus.

According to a sixth aspect of the present disclosure, a non-transitory computer readable storage medium is provided, the non-transitory computer readable storage medium includes one or more programs, and the one or more programs are configured to perform the method in the first aspect.

According to a seventh aspect of the present disclosure, a terminal is provided, and includes:

the non-transitory computer readable storage medium in the sixth aspect; and one or more processors, configured to execute the programs in the non-transitory computer readable storage medium.

According to an eighth aspect of the present disclosure, a computer program product is provided. The computer program product includes a computer program executable by a programmable apparatus. The computer program includes a code part configured to perform the method in the second aspect when being executed by the programmable apparatus.

According to a ninth aspect of the present disclosure, a non-transitory computer readable storage medium is provided, the non-transitory computer readable storage medium includes one or more programs, and the one or more programs are configured to perform the method in the second aspect.

According to a tenth aspect of the present disclosure, a network-side device is provided, and includes:

the non-transitory computer readable storage medium in the eighth aspect; and one or more processors, configured to execute the programs in the non-transitory computer readable storage medium.

According to the solutions in the present disclosure, an uplink and downlink frequency pairing transmission solution can be effectively supported, different scheduling policies are used for different terminals, access from terminals having different radio frequency capabilities is supported, diversity and design flexibility of a terminal are maintained, and a low-cost terminal can also enjoy, through scheduling, a performance gain brought by the foregoing pairing solution.

It should be understood that the above general descriptions and the following detailed descriptions are merely for exemplary and explanatory purposes, and cannot limit the present disclosure.

Other features and advantages of the present disclosure are described in detail in the subsequent specific implementation part.

BRIEF DESCRIPTION OF THE DRAWINGS

The accompanying drawings, which are incorporated herein and constitute a part of this specification, illustrate

DETAILED DESCRIPTION

To make the objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the embodiments described in the following are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
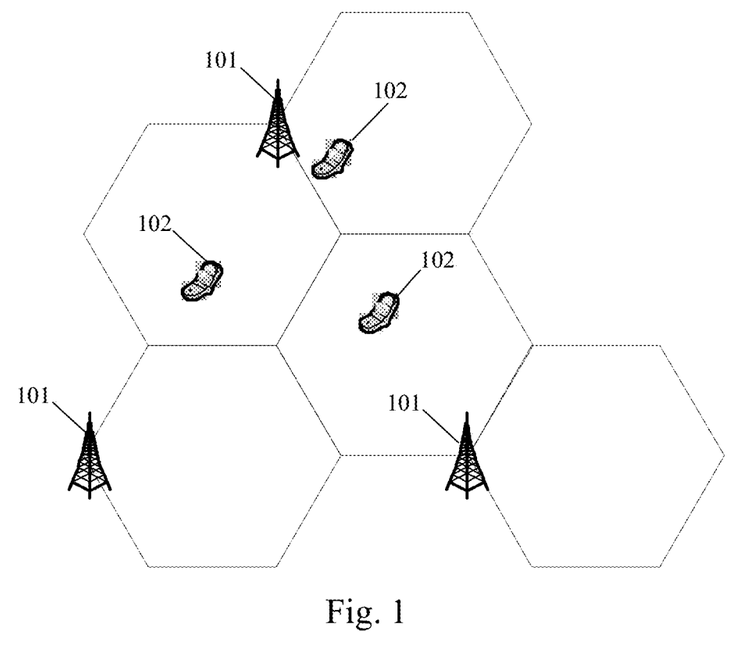
FIG. 1 is a schematic diagram of a wireless communication network according to an embodiment of the present disclosure.

FIG. 1 is a schematic diagram of a wireless communication network according to an embodiment of the present disclosure. The wireless communication network 100 includes: a network-side device 101 and a terminal 102. The network-side device 101 is a device that communicates with the terminal 102, and may provide communication coverage over a particular physical area. The network-side device 101 may be a base station (BS), a certain network element of a core network, another access network device that provides an access service and that is in the wireless communication network, or the like.

The terminal 102 may be distributed in the entire wireless communication network, and each terminal 102 may be static or mobile. For example, the terminal 102 may be a mobile station, a subscriber unit, a station, or a smartphone, or may be a wireless communication device, such as a cellular phone, a personal digital assistant (PDA), a handheld device, or a laptop computer.

Figure 2:
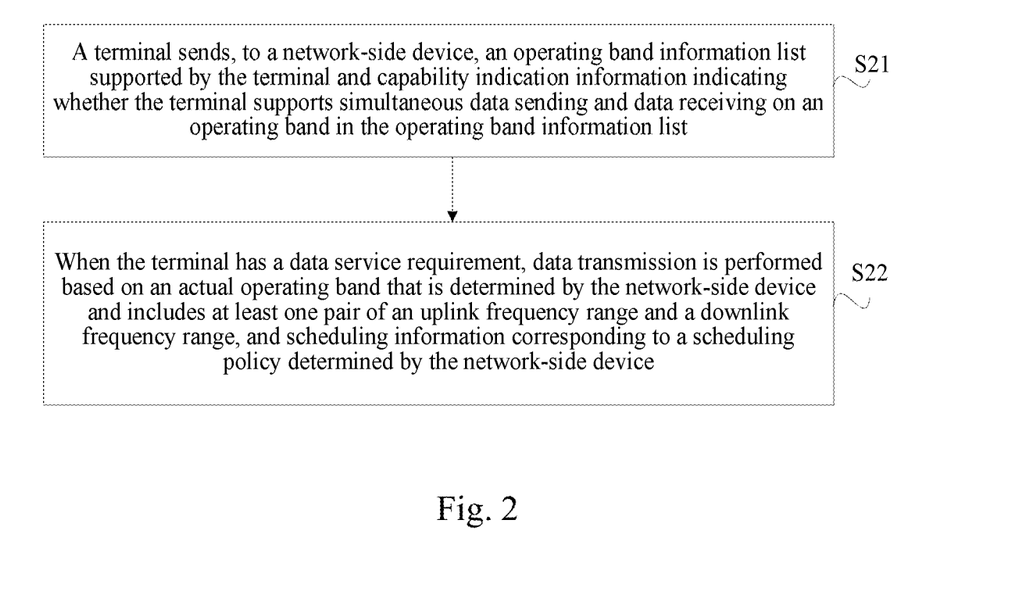
FIG. 2 is a schematic flowchart of performing data transmission by a terminal according to an embodiment of the present disclosure.

FIG. 2 is a schematic flowchart of performing data transmission by a terminal according to an embodiment of the present disclosure.

An operating band supported by the terminal and whether simultaneous data sending and data receiving is supported on the operating band in information about the supported operating band are determined by a hardware capability of the terminal. When pairing of a high frequency and a low frequency is used for the terminal, and corresponding hardware is also configured to prevent interference through filtering, the terminal supports simultaneous data sending and data receiving on the supported operating band. However, when pairing of a high frequency and a low frequency is used for the terminal, but no hardware is configured to prevent interference through filtering, the terminal does not support simultaneous data sending and data receiving on the supported operating band, but prevents interference between the high frequency and the low frequency by using a scheduling strategy.

Referring to FIG. 2, in an embodiment of the present disclosure, in step S21, the terminal sends, to a network-side device, an operating band information list supported by the terminal and capability indication information indicating whether the terminal supports simultaneous data sending and data receiving on an operating band in the operating band information list. The operating band information list is used by the network-side device to determine an actual operating band of the terminal (that is, an operating band used by the terminal to perform data transmission), and the actual operating band includes at least one pair of an uplink frequency range and a downlink frequency range. The capability indication information is used by the network-side device to determine a scheduling strategy for the terminal. The scheduling strategy is subsequently described in detail.

In step S22, when the terminal has a data service requirement, data transmission is performed based on the actual operating band that is determined by the network-side device and includes the at least one pair of the uplink frequency range and the downlink frequency range, and scheduling information corresponding to the scheduling strategy determined by the network-side device.

In an embodiment of the present disclosure, when the terminal performs attach for the first time in an access network, or the terminal initiates a call area update for the first time, or the terminal receives a terminal capability reporting request from the network-side device, the terminal may report the operating band information list and the capability indication information of the terminal to the network-side device.

In an embodiment of the present disclosure, if the terminal reports the operating band information list and the capability indication information to the network-side device when performing attach, the operating band information list of the terminal and the capability indication information indicating whether the terminal supports simultaneous data sending and data receiving on an operating band in the operating band information list are added to "capability information" reported when the terminal is attached.

The operating band information list includes at least one operating band supported by the terminal. In an embodiment, the operating band includes: band numbers corresponding to at least one uplink frequency range and at least one downlink frequency range. In some other embodiments, the operating band information list includes: at least one uplink frequency range and at least one downlink frequency range.

The uplink frequency range and the downlink frequency range in the operating band information list may be paired.

For example, Table 1 shows an operating band information list of the terminal in an embodiment of the present disclosure. When reporting the operating band information list, the terminal may report only band numbers, or may directly report an uplink frequency range and a downlink frequency range. It should be understood that, through negotiation or in a manner of one party telling the other party after determining, the network-side device and the terminal may enable each other to have a consistent understanding of frequency ranges corresponding to the band numbers.

TABLE 1

| Band number corresponding to the operating band supported by the terminal | Uplink frequency range | Downlink frequency range |
| --- | --- | --- |
| Band1 | Range 1: 880 MHz to 915 MHz<br>Range 2: 3300 MHz to 4200 MHz<br>Range 3: 1710 MHz to 1785 MHz | 3300 MHz to 4200 MHz |
| Band3 | 880 MHz to 915 MHz | 925 MHz to 960 MHz |
| Band5 | 3300 MHz to 4200 MHz | 3300 MHz to 4200 MHz |

In an embodiment of the present disclosure, the capability indication information indicating whether the terminal supports simultaneous data sending and data receiving on the operating band in the supported operating band information list may be defined in the following manners:

Manner 1:

The capability indication information indicating whether the terminal supports simultaneous data sending and data receiving on the operating band is added to the supported operating band information list reported by the terminal. Each operating band corresponds to one piece of capability indication information.

For an operating band, when simultaneous data sending and data receiving are supported by frequency pairing combinations among all corresponding frequency pairing combinations of uplink frequency ranges and downlink frequency ranges, other than frequency pairing combinations in which uplink and downlink frequency ranges are the same, capability indication information of the operating band is set to "True" or "1".

For an operating band, when simultaneous data sending and data receiving are not supported by at least one frequency pairing combinations of an uplink frequency range and a downlink frequency range, other than frequency pairing combinations in which uplink and downlink frequency ranges are the same, capability indication information of the operating band is set to "False" or "0".

Table 2 shows a correspondence between an operating band and capability indication information according to an embodiment of the present disclosure.

TABLE 2

| Band number of the supported operating band | Uplink frequency range | Downlink frequency range | Capability indication information |
| --- | --- | --- | --- |
| Band1 | Range 1: 880 MHz to 915 MHz<br>Range 2: 3300 MHz to 4200 MHz<br>Range 3: 1710 MHz to 1785 MHz | 3300 MHz to 4200 MHz | 1 |
| Band3 | 880 MHz to 915 MHz | 925 MHz to 960 MHz | 1 |
| Band5 | 3300 MHz to 4200 MHz | 3300 MHz to 4200 MHz | 0 |

Referring to Table 2, the capability indication information of the band 1 is "1". In this case, for the band 1, the terminal supports simultaneous data sending and data receiving in all combinations of uplink frequency ranges and downlink frequency ranges, other than a combination in which uplink and downlink frequency ranges are the same, namely, a combination of an uplink frequency range 2 and a downlink frequency range. To be specific, the terminal supports simultaneous data sending and data receiving, in both a pairing combination of the uplink frequency range 880 MHz to 915 MHz and the downlink frequency range 3300 MHz to 4200 MHz, and a pairing combination of the uplink frequency range 1710 MHz to 1785 MHz and the downlink frequency range 3300 MHz to 4200 MHz.

Referring to Table 2, the capability indication information of the band 3 is "1". To be specific, the terminal supports simultaneous data sending and data receiving in a pair of the uplink frequency range 880 MHz to 915 MHz and the downlink frequency range 925 MHz to 960 MHz.

Referring to Table 2, the capability indication information of the band 5 is "0". To be specific, the terminal does not support simultaneous data sending and data receiving in a pair of the uplink frequency range 3300 MHz to 4200 MHz and the downlink frequency range 3300 MHz to 4200 MHz.

In this manner, for an operating band, regardless of a quantity of frequency pairing combinations included in the operating band, only one bit of capability indication information is needed, and signaling overheads are relatively small.

Manner 2:

The capability indication information indicating whether the terminal supports simultaneous data sending and data receiving on the operating band is added to the supported operating band information list reported by the terminal. A pair of any uplink frequency range and any downlink frequency range on each operating band corresponds to one piece of capability indication information.

When the capability indication information is True or "1", it indicates that a corresponding pair of an uplink frequency range and a downlink frequency range supports simultaneous data sending and data receiving.

As shown in Table 2, when numbers of operating bands supported by a terminal are a band 1 and a band 3, possible pairs of uplink frequency ranges and downlink frequency ranges for the band 1 are as follows:

Pair 1: the uplink frequency range 880 MHz to 915 MHz and the downlink frequency range 3300 MHz to 4200 MHz.

Pair 2: the uplink frequency range 3300 MHz to 4200 MHz and the downlink frequency range 3300 MHz to 4200 MHz.

Pair 3: the uplink frequency range 1710 MHz to 1785 MHz and the downlink frequency range 3300 MHz to 4200 MHz.

It can be seen that, for the band 1, capability indication information corresponding to the band 1 includes: capability indication information of the pair 1, capability indication information of the pair 2, and capability indication information of the pair 3. If a value of the capability indication information is {1, 0, 1}, the terminal supports simultaneous data sending and data receiving in the pair 1, does not support simultaneous data sending and data receiving in the pair 2, and supports simultaneous data sending and data receiving in the pair 3.

In this manner, each frequency pair has corresponding capability indication information, so that greater flexibility is achieved, thereby helping to increase a throughput of the terminal and reducing a data transmission delay.

Therefore, it may be determined, based on a quantity of frequency pairs in the operating band information list and requirements on the throughput of the terminal and the delay, that either of or a combination of the two manners is used.

On a network side, the network-side device receives an operating band information list and capability indication information indicating whether the terminal supports simultaneous data sending and data receiving in an operating band in the operating band information list, where the operating band information list and the capability indication information are reported by the terminal. In an embodiment of the present disclosure, the network-side device stores the operating band information list and the capability indication information that are reported by the terminal, to determine, based on the stored operating band information list and capability indication information, as required, an uplink frequency range and a downlink frequency range that correspond to an actual operating band, and a scheduling strategy for the terminal.

Figure 3:
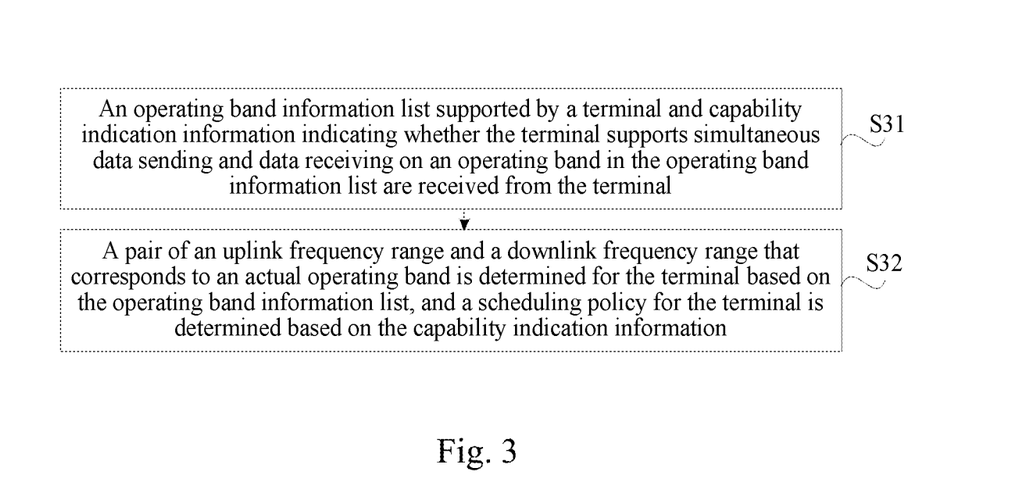
FIG. 3 is a schematic flowchart of performing resource scheduling on a terminal by a network-side device according to an embodiment of the present disclosure.

FIG. 3 is a schematic flowchart of performing resource scheduling on a terminal by a network-side device according to an embodiment of the present disclosure.

In step S31, an operating band information list supported by the terminal and capability indication information indicating whether the terminal supports simultaneous data sending and data receiving on an operating band in the operating band information list are received from the terminal.

In step S32, a pair of an uplink frequency range and a downlink frequency range that corresponds to an actual operating band is determined for the terminal based on the operating band information list, and a scheduling strategy for the terminal is determined based on the capability indication information.

Determination of Paired Frequency Range

The network-side device may determine, based on the received operating band information list, the pair of the uplink frequency range and the downlink frequency range that corresponds to the actual operating band and that is used by the terminal to perform data transmission.

In an embodiment, based on the operating band information list supported by the terminal, a network coverage status, and a service requirement, the network-side device determines a pair of an uplink frequency range and a downlink frequency range that corresponds to an actual operating band. The network-side device determines, in the operating band information list supported by the terminal, a pair of an uplink frequency range and a downlink frequency range based on the network coverage status and the service requirement, and selects an uplink band and a downlink band that satisfy service coverage of the terminal and the service requirement.

After determining, for the terminal, the pair of the uplink frequency range and the downlink frequency range that corresponds to the actual operating band, the network-side device sends the pair of the uplink frequency range and the downlink frequency range that corresponds to the actual operating band to the terminal. The terminal performs uplink data sending in the uplink frequency range, and performs downlink data receiving in the downlink frequency range. In an embodiment, the network-side device sends the determined pairing of uplink frequency range and downlink frequency range to the terminal by using dedicated signaling.

Determination of Scheduling Strategy

The network-side device determines the scheduling strategy for the terminal based on the received capability indication information of the terminal, and schedules the terminal based on the determined scheduling strategy.

The foregoing manner 1 or manner 2 may be used for the operating band information list reported by the terminal. When the manner 1 is used, the capability indication information includes capability indication information of each operating band in the operating band information list. When the capability indication information indicates that the terminal supports simultaneous data sending and data receiving on the actual operating band determined for the terminal by the network-side device, it is determined that the scheduling strategy for the terminal is a first scheduling scheme and a first ACK/NACK transmission time sequence.

When the capability indication information indicates that the terminal does not support simultaneous data sending and data receiving on the actual operating band determined for the terminal by the network-side device, it is determined that the scheduling strategy for the terminal is a second scheduling scheme and a second ACK/NACK transmission time sequence.

When the manner 2 is used, the capability indication information includes: capability indication information of each frequency pairing combination of an uplink frequency range and a downlink frequency range in the operating band supported by the terminal. When the capability indication information indicates that the terminal supports simultaneous data sending and data receiving in the determined pair of the uplink frequency range and the downlink frequency range in the actual operating band determined for the terminal by the network-side device, it is determined that the scheduling strategy for the terminal is a first scheduling scheme and a first ACK/NACK transmission time sequence.

When the capability indication information indicates that the terminal does not support simultaneous data sending and data receiving in the determined pair of the uplink frequency range and the downlink frequency range in the actual operating band determined for the terminal by the network-side device, it is determined that the scheduling strategy for the terminal is a second scheduling scheme and a second ACK/NACK transmission time sequence.

In an embodiment of the present disclosure, the first scheduling scheme includes: performing scheduling for the terminal based on an amount of data to be transmitted in buffer that is carried in an uplink scheduling request of the terminal; or performing scheduling for the terminal based on an amount of data to be transmitted in buffer that is carried in a downlink scheduling request of the terminal.

When the terminal has an uplink data sending requirement, the terminal sends an uplink scheduling request to the network-side device. The uplink scheduling request may include an amount of uplink data to be transmitted in buffer (i.e., the terminal notifies the network-side device of a quantity of data packets to be transmitted). The network-side device allocates a resource to the terminal based on the amount of uplink data to be transmitted and status of a current downlink shared channel, to implement scheduling.

In an embodiment of the present disclosure, the first ACK/NACK transmission time sequence includes: setting an ACK/NACK feedback time sequence for the terminal, so that the terminal feeds back an ACK message in the feedback time sequence after correctly receiving downlink data, or so that the terminal feeds back a NACK message in the feedback time sequence when the terminal does not correctly receive downlink data.

In an embodiment of the present disclosure, the second scheduling scheme includes: determining, based on a priority of uplink sent data and a priority of downlink received data, a data transmission direction that is of the terminal and that is at a current scheduling moment. In other words, it is determined, based on priorities of uplink sent data and downlink received data that need to be transmitted at a current scheduling moment, whether the uplink sent data is transmitted at the current scheduling moment by using a determined uplink frequency, or the downlink received data is transmitted at the current scheduling moment by using a determined downlink frequency. When the priority level of the downlink received data is higher than the priority level of the uplink sent data, the uplink sent data is not scheduled for the terminal at the current scheduling moment; or when the priority level of the uplink sent data is higher than the priority level of the downlink received data, the downlink received data is not scheduled for the terminal at a current scheduling moment.

In an embodiment, the priorities may be determined based on a type of carried data, to be specific, determined based on seriousness of impact caused by a loss of the to-be-transmitted uplink data to system performance and user experience. For example, priorities may be set as follows: priorities of broadcast information and synchronized information are the highest, and are successively followed by priorities of downlink common control information, random access request information, scheduling request information, ACK/NACK feedback information, channel quality feedback information, and the like in descending order of the priorities.

In an embodiment of the present disclosure, the second ACK/NACK transmission time sequence includes: after ACK/NACK feedback information to be transmitted at a current scheduling moment for downlink data received at a previous scheduling moment is forbidden, transmitting, at a sending moment of the first piece of scheduled uplink data, the ACK/NACK feedback information for the downlink data received at the previous scheduling moment, or after ACK/NACK feedback information that is for uplink data received at a previous scheduling moment and that plans to be transmitted at a current scheduling moment is forbidden, transmitting, at a sending moment of the first piece of scheduled downlink data, the ACK/NACK feedback information for the uplink data received at the previous scheduling moment.

When the priority level of the downlink received data is relatively high, the network-side device forbids sending data in the uplink frequency range at the current scheduling moment (in other words, the uplink sent data is not scheduled for the terminal at the current scheduling moment), to protect downlink data receiving quality. If the forbidden uplink sent data includes the ACK/NACK feedback information of the downlink received data, the ACK/NACK feedback information of the downlink received data is transmitted in a next scheduling period, or the ACK/NACK feedback information of the downlink received data received in a previous scheduling period is transmitted at a scheduling moment of the allowed first piece of uplink sent data based on priorities of data transmission in the second scheduling scheme. In other words, a priority is determined in each scheduling period (such as 1 ms). When the priority level of the uplink sent data is higher than the priority level of the downlink received data for the first time, the scheduling moment of the first piece of uplink sent data is obtained, and the ACK/NACK feedback information of the downlink received data received in the previous scheduling period is transmitted at this scheduling moment. The previous scheduling period may be a plurality of previous scheduling periods herein.

Figure 4:
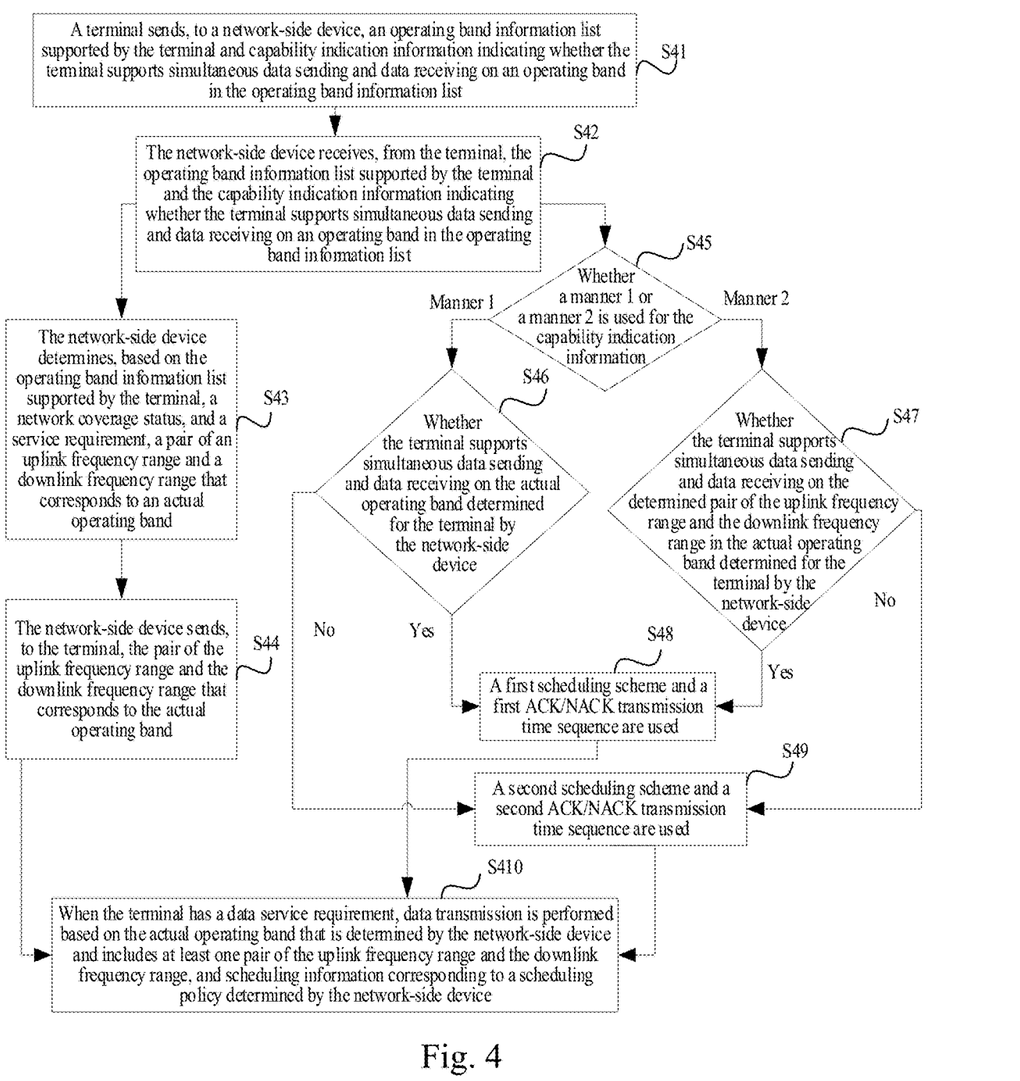
FIG. 4 is a schematic flowchart of a method for implementing resource scheduling through an interaction between a terminal and a network-side device according to an embodiment of the present disclosure.

FIG. 4 is a schematic flowchart of a method for implementing resource scheduling through an interaction between a terminal and a network-side device according to an embodiment of the present disclosure.

In step S41, the terminal sends, to the network-side device, an operating band information list supported by the terminal and capability indication information indicating whether the terminal supports simultaneous data sending and data receiving on an operating band in the operating band information list.

In step S42, the network-side device receives, from the terminal, the operating band information list supported by the terminal and the capability indication information indicating whether the terminal supports simultaneous data sending and data receiving on an operating band in the operating band information list.

In step S43, the network-side device determines, based on the operating band information list supported by the terminal, a network coverage status, and a service requirement, a pair of an uplink frequency range and a downlink frequency range that corresponds to an actual operating band.

In step S44, the network-side device sends, to the terminal, the pair of the uplink frequency range and the downlink frequency range that corresponds to the actual operating band.

In step S45, the network-side device determines whether a manner 1 or a manner 2 is used for the capability indication information reported by the terminal, and if the manner 1 is used, perform step S46; or if the manner 2 is used, perform step S47.

In step S46, the network-side device determines whether the terminal supports simultaneous data sending and data receiving on the actual operating band determined for the terminal by the network-side device, and if the terminal supports the simultaneous data sending and data receiving, determines, in step S48, to use a first scheduling scheme and a first ACK/NACK transmission time sequence for the terminal; or if the terminal does not support the simultaneous data sending and data receiving, determines, in step S49, to use a second scheduling scheme and a second ACK/NACK transmission time sequence for the terminal.

In step S47, the network-side device determines whether the terminal supports simultaneous data sending and data receiving at the determined pair of the uplink frequency range and the downlink frequency range in the actual operating band determined for the terminal by the network-side device, and if the terminal supports the simultaneous data sending and data receiving, determines, in step S48, to use a first scheduling scheme and a first ACK/NACK transmission time sequence for the terminal; or if the terminal does not support the simultaneous data sending and data receiving, determines, in step S49, to use a second scheduling scheme and a second ACK/NACK transmission time sequence for the terminal.

In step S410, when the terminal has a data service requirement, data transmission is performed based on the actual operating band that is determined by the network-side device and that includes at least one pair of an uplink frequency range and a downlink frequency range, and scheduling information corresponding to a scheduling strategy determined by the network-side device.

Therefore, according to the embodiments of the present disclosure, the scheduling strategy is determined based on the operating band information list and the capability indication information reported by the terminal, and different scheduling strategies are used for different terminals, so that an uplink and downlink frequency pairing transmission solution can be effectively supported, access from terminals having different radio frequency capabilities is supported, diversity and design flexibility of a terminal are maintained, and a low-cost terminal can also enjoy, through scheduling, a performance gain brought by the foregoing pairing solution.

Figure 5:
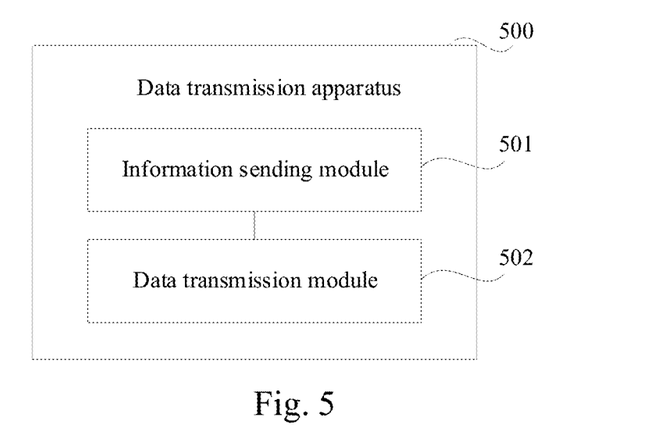
FIG. 5 is a block diagram of a data transmission apparatus according to an embodiment of the present disclosure.

Correspondingly, referring to FIG. 5, an embodiment of the present disclosure further provides a data transmission apparatus, applied to a terminal, and the apparatus 500 includes:

an information sending module 501, configured to send, to a network-side device, an operating band information list supported by the terminal and capability indication information indicating whether the terminal supports simultaneous data sending and data receiving on an operating band in the operating band information list, where the operating band information list is used by the network-side device to determine an actual operating band of the terminal, the actual operating band includes at least one pair of an uplink frequency range and a downlink frequency range, and the capability indication information is used by the network-side device to determine a scheduling strategy for the terminal; and a data transmission module 502, configured to perform, when the terminal has a data service requirement, data transmission based on the actual operating band that is determined by the network-side device and that includes the at least one pair of the uplink frequency range and the downlink frequency range, and scheduling information corresponding to the scheduling strategy determined by the network-side device.

In an embodiment, the operating band information list includes:

at least one operating band supported by the terminal; and the operating band includes band numbers corresponding to at least one uplink frequency range and at least one downlink frequency range; or the operating band includes at least one uplink frequency range and at least one downlink frequency range.

In an embodiment, the capability indication information includes capability indication information corresponding to each operating band in the at least one operating band; and the apparatus further includes:

a first capability indication information determining module, configured to determine the capability indication information of each operating band depending on whether all frequency pairing combinations of uplink frequency ranges and downlink frequency ranges, other than frequency pairing combinations in which uplink and downlink frequency ranges are the same in pairing combinations of at least one uplink frequency range and at least one downlink frequency range of each operating band, support simultaneous data sending and data receiving.

In an embodiment, the capability indication information includes capability indication information of frequency pairing combinations of uplink frequency ranges and downlink frequency ranges that correspond to each operating band in the operating band information list; and the apparatus further includes:

a first capability indication information determining module, configured to determine the capability indication information of each frequency pairing combination in each operating band in the operating band information list, according to determination on whether simultaneous data sending and data receiving are supported by each of the frequency pairing combinations of uplink frequency ranges and downlink frequency ranges in each operating band in the operating band information list.

Figure 6:
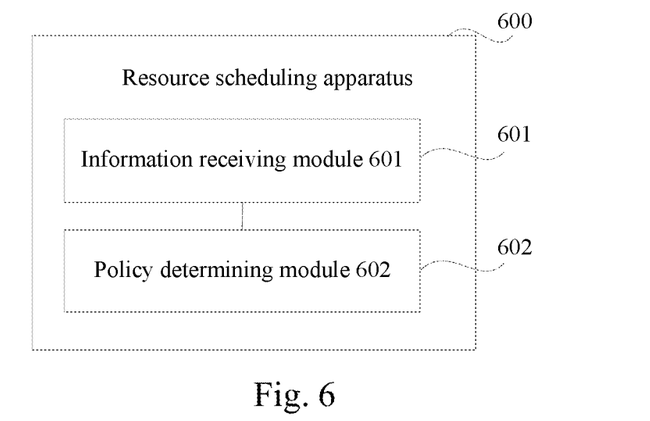
FIG. 6 is a block diagram of a resource scheduling apparatus according to an embodiment of the present disclosure.

Referring to FIG. 6, an embodiment of the present disclosure further provides a resource scheduling apparatus, applied to a network-side device, and the apparatus 600 includes:

an information receiving module 601, configured to receive, from a terminal, an operating band information list supported by the terminal and capability indication information indicating whether the terminal supports simultaneous data sending and data receiving on an operating band in the operating band information list, or capability indication information indicating whether the terminal supports simultaneous data sending and data receiving on each frequency pairing combination in each operating band in the operating band information list; and a strategy determining module 602, configured to: determine, for the terminal based on the operating band information list, a pair of an uplink frequency range and a downlink frequency range that corresponds to an actual operating band, and determine a scheduling strategy for the terminal based on the capability indication information.

In an embodiment, the apparatus 600 further includes:

a pairing frequency determining module, configured to determine the pair of the uplink frequency range and the downlink frequency range that corresponds to the actual operating band for the terminal based on the operating band information list, a network coverage status, and a service requirement of the terminal; and a frequency pairing sending module, configured to send, to the terminal, information about the pair of the uplink frequency range and the downlink frequency range that corresponds to the actual operating band.

In an embodiment, the strategy determining module 602 includes:

a first strategy determining submodule, configured to determine a first scheduling scheme and a first ACK/NACK transmission time sequence as the scheduling strategy for the terminal, when the capability indication information indicates that the terminal supports simultaneous data sending and data receiving on the determined actual operating band, or when the capability indication information indicates that the terminal supports simultaneous data sending and data receiving on the determined pair of the uplink frequency range and the downlink frequency range in the actual operating band; and a second strategy determining submodule, configured to determine a second scheduling scheme and a second ACK/NACK transmission time sequence as the scheduling strategy for the terminal, when the capability indication information indicates that the terminal does not support simultaneous data sending and data receiving on the determined actual operating band, or when the capability indication information indicates that the terminal does not support simultaneous data sending and data receiving on the determined pair of the uplink frequency range and the downlink frequency range in the actual operating band.

Specific manners for modules in the apparatus in the foregoing embodiment to perform operations have been described in detail in the embodiments of the method. Details are not described herein again.

Figure 7:
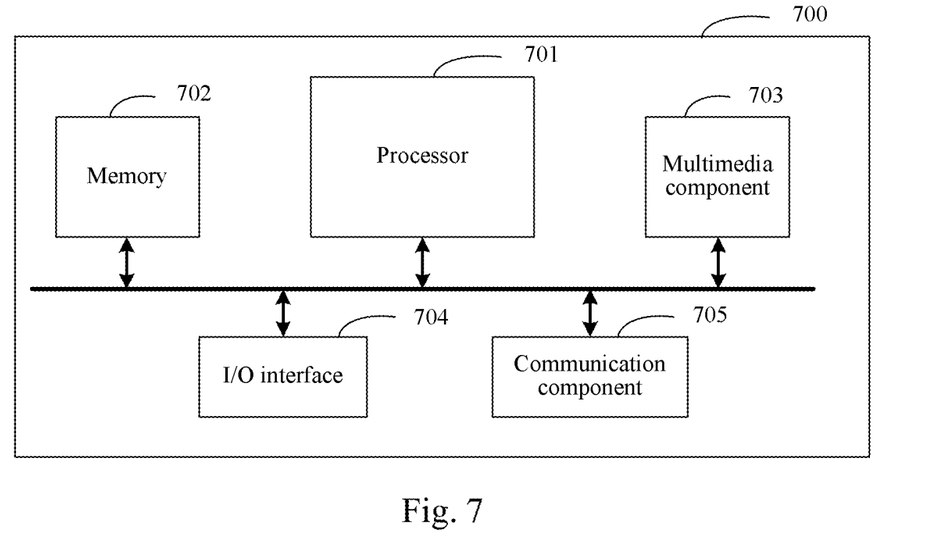
FIG. 7 is a block diagram of an apparatus used for a data transmission method according to an exemplary embodiment.

FIG. 7 is a block diagram of an apparatus 700 used for a data transmission method according to an exemplary embodiment. The apparatus 700 may be a terminal. As shown in the figure, the apparatus 700 may include: a processor 701, a memory 702, and a communication component 705.

The processor 701 is configured to control an overall operation of the apparatus 700, to complete all or some steps in the foregoing data transmission method. The memory 702 is configured to store an operating system and various types of data, to support an operation on the apparatus 700. For example, these data may include an instruction that is of any application program or method and that is used to be operated on the apparatus 700, and data related to an application program. The memory 702 may be implemented by using a volatile or non-volatile storage device of any type or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a disk, or an optical disc.

The communication component 705 is used by the apparatus 700 to perform wired and wireless communication with another device. For example, the wireless communication includes Wi-Fi, Bluetooth, near field communication (NFC), 2G, 3G, 4G, or 5G, or a combination of one or more thereof. Therefore, correspondingly, the communication component 705 may include: a Wi-Fi module, a Bluetooth module, an NFC module.

In an exemplary embodiment, the apparatus 700 may be implemented by one or more application specific integrated circuits (ASIC), digital signal processors (DSP), digital signal processor devices (DSPD), programmable logic devices (PLD), field programmable gate arrays (FPGA), controllers, microcontrollers, microprocessors, or other electronic components, and configured to perform the foregoing data transmission method.

The apparatus 700 further includes a multimedia component 703 and an I/O interface 704. The multimedia component 703 may include a screen and an audio component. For example, the screen may be a touchscreen, and the audio component is configured to output and/or input an audio signal. For example, the audio component may include a microphone, and the microphone is configured to receive an external audio signal. The received audio signal may be further stored in the memory 702 or sent by using the communication component 705. The audio component further includes at least one speaker, configured to output the audio signal. The I/O interface 704 is an interface provided between the processor 701 and another interface module, and the another interface module may be a keyboard, a mouse, a button, or the like. The button may be a virtual button or a physical button.

In another exemplary embodiment, a computer program product is further provided. The computer program product includes a computer program executable by a programmable apparatus. The computer program includes a code part configured to perform the foregoing data transmission method when being executed by the programmable apparatus.

In another exemplary embodiment, a non-transitory computer readable storage medium including an instruction is further provided, such as the memory 702 including an instruction. The instruction may be executed by the processor 701 of the apparatus 700 to perform the foregoing data transmission method. For example, the non-transitory computer readable storage medium may be a ROM, a random access memory (RAM), a CD-ROM, a magnetic tape, a floppy disk, an optical data storage device, or the like.

Figure 8:
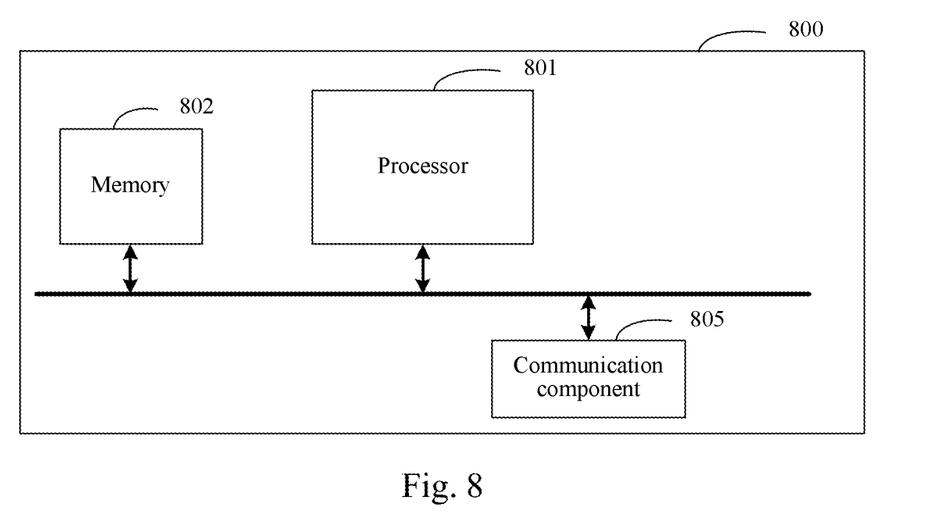
FIG. 8 is a block diagram of an apparatus used for a resource scheduling method according to an exemplary embodiment.

FIG. 8 is a block diagram of an apparatus 800 used for a resource scheduling method according to an exemplary embodiment. The apparatus 800 may be a network-side device. As shown in the figure, the apparatus 800 may include: a processor 801, a memory 802, and a communication component 805.

The processor 801 is configured to control an overall operation of the apparatus 800, to complete all or some steps in the foregoing resource scheduling method. The memory 802 is configured to store an operating system and various types of data, to support an operation on the apparatus 800. For example, these data may include an instruction that is of any application program or method and that is used to be operated on the apparatus 800, and data related to an application program. The memory 802 may be implemented by using a volatile or non-volatile storage device of any type or a combination thereof, for example, an SRAM, an EEPROM, an EPROM, a PROM, a ROM, a magnetic memory, a flash memory, a disk, or an optical disc.

The communication component 805 is used by the apparatus 800 to perform wired and wireless communication with another device. For example, the wireless communication includes Wi-Fi, Bluetooth, NFC, 2G, 3G, 4G, or 5G, or a combination of one or more thereof. Therefore, correspondingly, the communication component 805 may include: a Wi-Fi module, a Bluetooth module, an NFC module.

In an exemplary embodiment, the apparatus 800 may be implemented by one or more ASICs, DSPs, DSPDs, PLDs, FPGAs, controllers, microcontrollers, microprocessors, or other electronic components, to perform the foregoing resource scheduling method.

In another exemplary embodiment, a computer program product is further provided. The computer program product includes a computer program executable by a programmable apparatus. The computer program includes a code part configured to perform the foregoing resource scheduling method when being executed by the programmable apparatus.

In another exemplary embodiment, a non-transitory computer readable storage medium including an instruction is further provided, such as the memory 802 including an instruction. The instruction may be executed by the processor 801 of the apparatus 800 to perform the foregoing resource scheduling method. For example, the non-transitory computer readable storage medium may be a ROM, a RAM, a CD-ROM, a magnetic tape, a floppy disk, an optical data storage device, or the like.

Any process or method description described in another manner in a flowchart or an embodiment of the present disclosure may be understood as a module, a segment, or a part that represents code including one or more executable instructions used to implement a particular logical function or a step of a process. In addition, a range of implementations of the present disclosure includes another implementation, and a function may be performed not in a shown or discussed sequence, including that a function may be performed in a basically simultaneous manner or in a reverse sequence based on the related function. This should be understood by the person skilled in the art of the embodiments of the present disclosure.

After considering the specification and practicing the present disclosure, the person skilled in the art would easily conceive of other implementation solutions of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the art. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A data transmission method applied to a terminal, comprising:

sending, to a network-side device, an operating band information list supported by the terminal and capability indication information indicating whether the terminal supports simultaneous data sending and data receiving on an operating band in the operating band information list, wherein the operating band information list is used by the network-side device to determine an actual operating band of the terminal, the actual operating band comprises at least one pair of an uplink frequency range and a downlink frequency range, and the capability indication information is used by the network-side device to determine a scheduling strategy for the terminal; and performing, when the terminal has a data service requirement, data transmission based on the actual operating band that is determined by the network-side device and that comprises the at least one pair of the uplink frequency range and the downlink frequency range, and scheduling information corresponding to the scheduling strategy determined by the network-side device;

wherein:

the scheduling strategy for the terminal is determined to include a first scheduling scheme and a first ACK/NACK transmission time sequence when the capability indication information indicates that the terminal supports simultaneous data sending and data receiving on the determined actual operating band, or when the capability indication information indicates that the terminal supports simultaneous data sending and data receiving on the determined pair of the uplink frequency range and the downlink frequency range in the actual operating band; and the scheduling strategy for the terminal is determined to include a second scheduling scheme and a second ACK/NACK transmission time sequence when the capability indication information indicates that the terminal does not support simultaneous data sending and data receiving on the determined actual operating band, or when the capability indication information indicates that the terminal does not support simultaneous data sending and data receiving on the determined pair of the uplink frequency range and the downlink frequency range in the actual operating band.

2. The method according to claim 1, wherein the operating band information list comprises at least one operating band supported by the terminal; and the operating band comprises band numbers corresponding to at least one uplink frequency range and at least one downlink frequency range; or the operating band comprises at least one uplink frequency range and at least one downlink frequency range.

3. The method according to claim 2, wherein the capability indication information comprises capability indication information corresponding to each operating band in the at least one operating band; and the method comprises:

determining the capability indication information of each operating band, according to determination on whether simultaneous data sending and data receiving are supported by frequency pairing combinations among at least one frequency pairing combinations of uplink frequency ranges and downlink frequency ranges in each operating band, other than frequency pairing combinations in which uplink and downlink frequency ranges are the same.

4. The method according to claim 2, wherein the capability indication information comprises capability indication information of frequency pairing combinations of uplink frequency ranges and downlink frequency ranges that correspond to each operating band in the operating band information list; and the method comprises:

determining the capability indication information of each of the frequency pairing combinations in each operating band in the operating band information list, according to determination on whether simultaneous data sending and data receiving are supported by each of the frequency pairing combinations of uplink frequency ranges and downlink frequency ranges in each operating band in the operating band information list.

5. A computer program product, comprising a computer program executable by a programmable apparatus, the computer program comprising a code part configured to perform the method according to claim 1 when being executed by the programmable apparatus.

6. A non-transitory computer readable storage medium, comprising one or more programs, the one or more programs being configured to perform the method according to claim 1.

7. A resource scheduling method applied to a network-side device, comprising:

receiving, from a terminal, an operating band information list supported by the terminal and capability indication information indicating whether the terminal supports simultaneous data sending and data receiving on an operating band in the operating band information list, or capability indication information indicating whether the terminal supports simultaneous data sending and data receiving on each frequency pairing combination in each operating band in the operating band information list; and determining, for the terminal based on the operating band information list, a pair of an uplink frequency range and a downlink frequency range that corresponds to an actual operating band, and determining a scheduling strategy for the terminal based on the capability indication information;

wherein determining a scheduling strategy for the terminal based on the capability indication information comprises:

determining a first scheduling scheme and a first ACK/NACK transmission time sequence as the scheduling strategy for the terminal, when the capability indication information indicates that the terminal supports simultaneous data sending and data receiving on the determined actual operating band, or when the capability indication information indicates that the terminal supports simultaneous data sending and data receiving on the determined pair of the uplink frequency range and the downlink frequency range in the actual operating band; and determining a second scheduling scheme and a second ACK/NACK transmission time sequence as the scheduling strategy for the terminal, when the capability indication information indicates that the terminal does not support simultaneous data sending and data receiving on the determined actual operating band, or when the capability indication information indicates that the terminal does not support simultaneous data sending and data receiving on the determined pair of the uplink frequency range and the downlink frequency range in the actual operating band.

8. The method according to claim 7, further comprising: determining the pair of the uplink frequency range and the downlink frequency range that corresponds to the actual operating band for the terminal based on the operating band information list, a network coverage status, and a service requirement of the terminal; and sending, to the terminal, information about the pair of the uplink frequency range and the downlink frequency range that corresponds to the actual operating band.

9. The method according to claim 7, wherein
the first scheduling scheme comprises: performing scheduling based on an amount of data to be transmitted that is carried in a scheduling request of the terminal;
the first ACK/NACK transmission time sequence comprises: setting an ACK/NACK feedback time sequence for the terminal, so that the terminal feeds back an ACK message in the feedback time sequence after correctly receiving downlink data, or so that the terminal feeds back a NACK message in the feedback time sequence when the terminal does not correctly receive downlink data;
the second scheduling scheme comprises: determining a data transmission direction for the terminal at a current scheduling moment, based on a priority level of uplink sent data and a priority level of downlink received data; and
the second ACK/NACK transmission time sequence comprises: after ACK/NACK feedback information planned to be transmitted at a current scheduling moment for downlink data received at a previous scheduling moment is forbidden, transmitting, at a moment for sending a first piece of scheduled uplink data, the ACK/NACK feedback information for the downlink data received at the previous scheduling moment; or after ACK/NACK feedback information planned to be transmitted at a current scheduling moment for uplink data received at a previous scheduling moment is forbidden, transmitting, at a moment for sending a first piece of scheduled downlink data, the ACK/NACK feedback information for the uplink data received at the previous scheduling moment.

10. The method according to claim 7, wherein the second scheduling scheme comprises:
when a priority level of downlink received data is higher than a priority level of uplink sent data, not performing uplink sent data scheduling on a carrier in the uplink frequency range for the terminal at a current scheduling moment; or
when a priority level of uplink sent data is higher than a priority level of downlink received data, not performing downlink received data scheduling on a carrier in the downlink frequency range for the terminal at a current scheduling moment.

11. A computer program product, comprising a computer program executable by a programmable apparatus, the computer program comprising a code part configured to perform the method according to claim 7 when being executed by the programmable apparatus.

12. A non-transitory computer readable storage medium, comprising: one or more programs, and the one or more programs being configured to perform the method according to claim 7.

13. A network-side device, comprising: the non-transitory computer readable storage medium according to claim 12, and one or more processors, configured to execute the one or more programs in the non-transitory computer readable storage medium.

14. A terminal, comprising: a non-transitory computer readable storage medium, and one or more processors; wherein the non-transitory computer readable storage medium comprises one or more programs, and the one or more processors are configured to causes the one or more programs to implement a data transmission method; and the method comprises:
sending, to a network-side device, an operating band information list supported by the terminal and capability indication information indicating whether the terminal supports simultaneous data sending and data receiving on an operating band in the operating band information list, wherein the operating band information list is used by the network-side device to determine an actual operating band of the terminal, the actual operating band comprises at least one pair of an uplink frequency range and a downlink frequency range, and the capability indication information is used by the network-side device to determine a scheduling strategy for the terminal; and
performing, when the terminal has a data service requirement, data transmission based on the actual operating band that is determined by the network-side device and that comprises the at least one pair of the uplink frequency range and the downlink frequency range, and scheduling information corresponding to the scheduling strategy determined by the network-side device;
wherein:
the scheduling strategy for the terminal is determined to include a first scheduling scheme and a first ACK/NACK transmission time sequence when the capability indication information indicates that the terminal supports simultaneous data sending and data receiving on the determined actual operating band, or when the capability indication information indicates that the terminal supports simultaneous data sending and data receiving on the determined pair of the uplink frequency range and the downlink frequency range in the actual operating band; and
the scheduling strategy for the terminal is determined to include a second scheduling scheme and a second ACK/NACK transmission time sequence when the capability indication information indicates that the terminal does not support simultaneous data sending and data receiving on the determined actual operating band, or when the capability indication information indicates that the terminal does not support simultaneous data sending and data receiving on the determined pair of the uplink frequency range and the downlink frequency range in the actual operating band.

15. The terminal according to claim 14, wherein the operating band information list comprises at least one operating band supported by the terminal; and the operating band comprises band numbers corresponding to at least one uplink frequency range and at least one downlink frequency range; or the operating band comprises at least one uplink frequency range and at least one downlink frequency range.

16. The terminal according to claim 15, wherein the capability indication information comprises capability indication information corresponding to each operating band in the at least one operating band; and the method further comprises:

determining the capability indication information of each operating band, according to determination on whether simultaneous data sending and data receiving are supported by frequency pairing combinations among at least one frequency pairing combinations of uplink frequency ranges and downlink frequency ranges in each operating band, other than frequency pairing combinations in which uplink and downlink frequency ranges are the same.

17. The terminal according to claim 15, wherein the capability indication information comprises capability indication information of frequency pairing combinations of uplink frequency ranges and downlink frequency ranges that correspond to each operating band in the operating band information list; and the method further comprises:

determining the capability indication information of each of the frequency pairing combinations in each operating band in the operating band information list, according to determination on whether simultaneous data sending and data receiving are supported by each of the frequency pairing combinations of uplink frequency ranges and downlink frequency ranges in each operating band in the operating band information list.

* * * * *